United States Patent [19]

Jones

[11] Patent Number: 5,110,152
[45] Date of Patent: May 5, 1992

[54] ACTIVE SUSPENSION SYSTEM

[75] Inventor: Neil Jones, Palm City, Fla.

[73] Assignee: TRW Inc., Lyndhurst, Ohio

[21] Appl. No.: 691,714

[22] Filed: Apr. 26, 1991

[51] Int. Cl.$^5$ .............................................. B60G 11/26
[52] U.S. Cl. ................................. 280/707; 364/424.05
[58] Field of Search ............................ 280/707, 772; 364/424.05

[56] References Cited

U.S. PATENT DOCUMENTS

| | | |
|---|---|---|
| 3,550,993 | 12/1970 | Peiffer . |
| 3,847,407 | 4/1975 | Griswold . |
| 4,006,391 | 2/1977 | Deering et al. . |
| 4,138,632 | 2/1979 | Pauwels et al. . |
| 4,170,279 | 10/1979 | Pelletier . |
| 4,483,409 | 11/1984 | Fun . |
| 4,625,993 | 12/1986 | Williams et al. . |
| 4,685,698 | 8/1987 | Klinkner et al. . |
| 4,743,046 | 5/1988 | Schnittger . |
| 4,766,921 | 8/1988 | Williams . |
| 4,787,649 | 11/1988 | Watanabe et al. .................. 280/707 |
| 4,825,370 | 4/1989 | Kufosawa ...................... 364/424.05 |
| 4,909,279 | 3/1990 | Nakamura et al. . |
| 4,999,777 | 3/1991 | Schusslet et al. .............. 364/424.05 |
| 5,015,009 | 5/1991 | Obyama et al. ..................... 280/707 |

*Primary Examiner*—H. Grant Skaggs
*Attorney, Agent, or Firm*—Tarolli, Sundheim & Covell

[57] ABSTRACT

A suspension control system for a vehicle having a sprung mass and an unsprung mass comprises a hydraulic actuator connected between the sprung mass and the unsprung mass, and a hydraulic circuit communicating the actuator with a pump and a reservoir. The hydraulic circuit includes an on-off valve assembly which controls the actuator. The system further comprises sensors for sensing inputs to the vehicle, and a controller for providing a demand signal in response to the sensed inputs. The demand signal indicates a desired motion or resistance to motion of the piston in the actuator to achieve a desired motion or resistance to motion of the sprung mass relative to the unsprung mass. A pulse width modulating circuit provides a PWM control signal for operating the on-off valve assembly in response to the demand signal. The PWM control signal has a duty cycle which is a function of the demand signal.

13 Claims, 2 Drawing Sheets

ACTIVE SUSPENSION SYSTEM

TECHNICAL FIELD

The present invention relates to suspension systems, and particularly relates to an active suspension system for a vehicle.

BACKGROUND

U.S. Pat. No. 4,625,993 discloses an active suspension system for an automotive vehicle. The active suspension system operates between the sprung (wheels) and unsprung (chassis) masses of the vehicle. It achieves and maintains (with no vehicle operator inputs or responses) a desired attitude, i.e., minimizes the motion, acceleration and vibration of the passenger compartment caused by road and vehicle dynamics, to improve vehicle handling, reduce noise, improve ride, and improve stability. These features of vehicle dynamics are achieved by controlling hydraulic suspension units located at the vehicle wheels. The system comprises a hydraulic circuit with hydraulic actuators and valves, a plurality of sensors, and an electrical control system. The hydraulic circuit communicates a source of pressurized hydraulic fluid with hydraulic actuators at the suspension units. The sensors sense acceleration and impact inputs to the vehicle, and the electrical control system controls the flow of hydraulic fluid in the actuators in response to the sensed inputs.

The suspension units in the active suspension system disclosed in the '993 patent each comprise a hydraulic actuator and a spring acting in parallel between a vehicle wheel and the vehicle chassis. An electro-hydraulic servo control valve associated with an actuator controls the flow of hydraulic fluid which effects movement of a piston in such actuator. Sensors at each suspension unit sense displacement between the wheel and the chassis, the load on the actuator, and acceleration of the wheel hub. Other sensors carried on the vehicle sense speed and acceleration of the vehicle.

The electrical control system responds to outputs from the sensors to provide displacement demand signals for each suspension unit so as to control static and dynamic displacement of the sprung and unsprung masses. The electrical control system also provides signals representing actual displacement for each suspension unit. The control system compares the displacement demand signals with the actual displacement signals to produce error signals. Each servo valve in the hydraulic circuit is operated in accordance with the associated error signal to cause the actual displacement of the piston in the associated actuator to equal the desired displacement. The active suspension system thus controls the positions of the pistons to achieve a desired vehicle attitude by operating the servo valves.

Servo valves in known active suspension systems are durable and have proved themselves to be reliable. One particular known servo valve for an active suspension system uses a magnetic coil to control displacement of a reed. The amount of displacement of the reed is functionally related to the amount of current applied to the coil. The reed is operatively located between two pilot control orifices. The pilot control orifices are in fluid communication with associated sides of a spool valve. The position of the spool valve, which is a function of the opposed pilot pressures, controls the fluid flow to an associated actuator. The position of the reed controls the pilot pressures. Such a servo valve is referred to as voltage controlled servo valve. While such voltage controlled servo valves have been satisfactory in an active suspension system, they are expensive.

SUMMARY OF THE INVENTION

In accordance with the present invention, an active suspension system for a vehicle comprises an actuator connectable between the vehicle chassis and a wheel hub. The actuator comprises a piston movable in at least one direction in a double-acting hydraulic ram in response to hydraulic fluid pressure acting on the piston in the ram. The suspension system further comprises a hydraulic circuit communicating the ram with a source of pressurized hydraulic fluid. The hydraulic circuit comprises a pulse-width modulated ("PWM") controlled on-off valve assembly which is operative between the ram and the source to vary the hydraulic fluid flow pressure in the ram, and thereby to control movement of the piston in the ram.

A sensing means senses acceleration, force and impact inputs to the vehicle. A control means provides a demand signal in response to the inputs. The demand signal indicates the desired motion, or resistance to motion, of the piston in the ram to cause a desired motion or resistance to motion of the vehicle wheel relative to the vehicle chassis. The control means provides the demand signal to the on-off valve assembly in the form of a PWM control signal having a duty cycle which is a function of the demand signal.

The present invention advantageously enables an active suspension system to maintain a desired attitude of a vehicle without the use of expensive voltage controlled servo valves. The on-off valve assembly, when operating in accordance with the duty cycle of the PWM control signal, has the same effect on hydraulic fluid pressure and flow at the actuator as does a voltage controlled servo valve which has a valve opening functionally related to the applied control voltage. The present invention, through use of a PWM controlled on-off valve assembly, greatly reduces the cost of an active suspension system for a vehicle.

In accordance with a preferred embodiment of the present invention, the hydraulic circuit includes an accumulator or attenuator between the on-off valve assembly and the ram. The accumulator averages fluid pressure variations resulting from repeated operations of the on-off valve assembly. The on-off valve assembly comprises first and second pilot operated check valves. The first check valve communicates one hydraulic working chamber in the ram with a pump and the accumulator when open. The second check valve communicates the same hydraulic working chamber with a reservoir when open. The hydraulic circuit further comprises an electrically operated direction control valve responsive to the PWM control signal. The direction control valve is operatively connected between a fluid pump and the pilot lines of the two check valves. The direction control valve has a first position blocking communication of the pump with the first and second pilot lines. The direction control valve has a second position communicating the pump with the first pilot line for opening the first check valve, and has a third position communicating the pump with the second pilot line for opening the second check valve. The direction control valve responds to the PWM control signal to open the check valves in accordance with the duty cycle of the PWM control signal. The quantity and pressure of the hydraulic fluid in the associated ram chamber is thus varied in accordance with the duty cycle of the PWM control signal, and consequently is varied in accordance with the demand signal.

BRIEF DESCRIPTION OF THE DRAWINGS

The foregoing and other features of the present invention will become apparent to those skilled in the art upon reading the following description of a preferred embodiment of the invention in view of the accompanying drawings, wherein.

DESCRIPTION OF A PREFERRED EMBODIMENT

Figure 1:
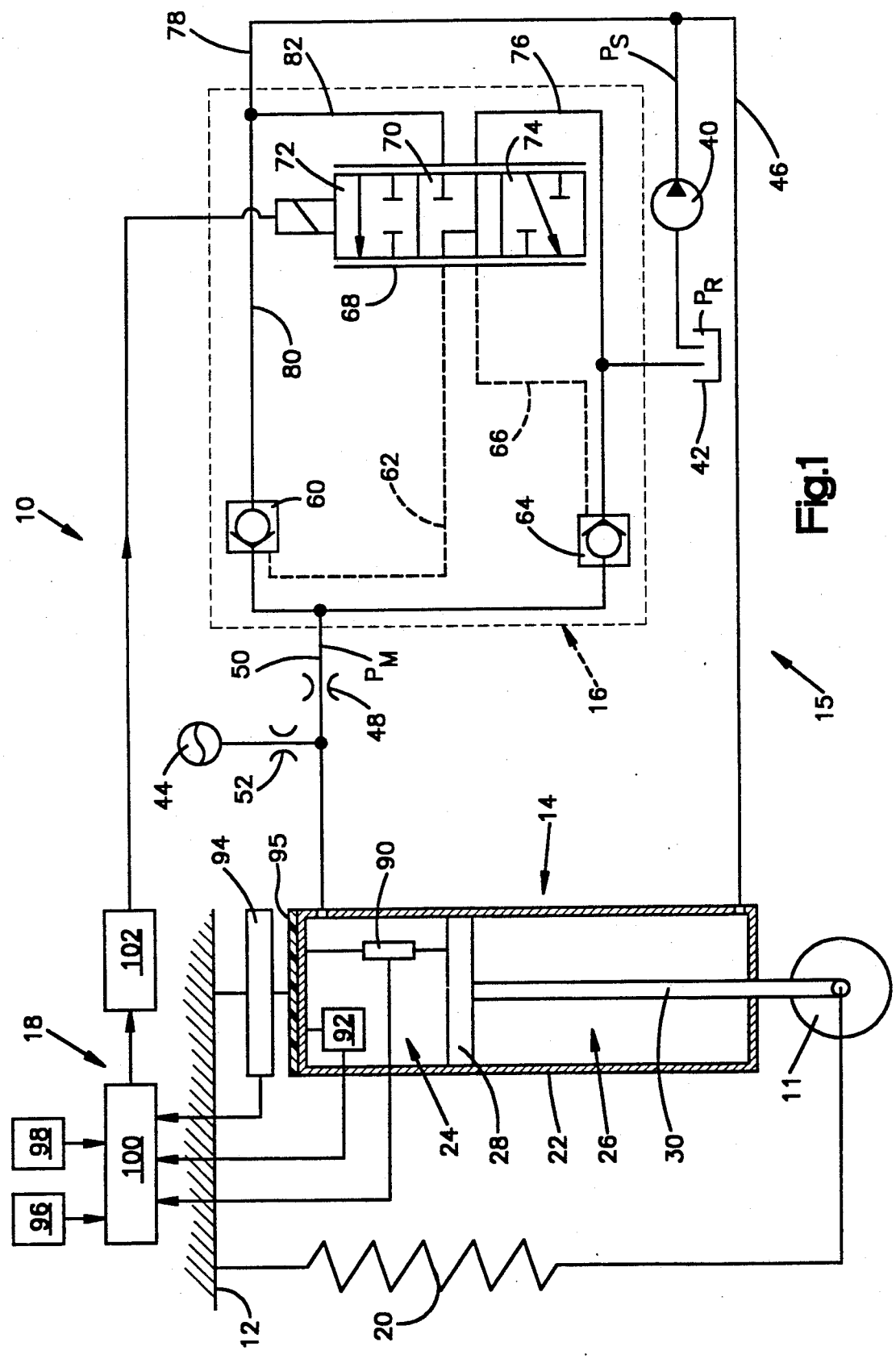
FIG. 1 is a schematic view of an active suspension system for a vehicle in accordance with the present invention.

As shown schematically in FIG. 1, an active suspension system 10 in accordance with a preferred embodiment of the present invention is installed in a vehicle having a wheel hub 11, i.e., an unsprung mass, and a vehicle chassis 12, i.e., a sprung mass. The vehicle has four wheeled corners. For the purpose of explanation, the active suspension system 10 is described in detail with reference to only one corner of the vehicle, it being understood that the active suspension system 10 is associated with the other three corners of the vehicle in a similar manner. The active suspension system 10 comprises a double-acting hydraulic actuator 14, a hydraulic circuit 15 including an on-off valve assembly 16, and an electrical control system 18.

The actuator 14 and a spring 20 are connected in parallel between the wheel hub 11 and the vehicle chassis 12. The actuator 14 comprises a hydraulic ram 22 in which upper and lower working chambers 24 and 26 are defined on opposite sides of a movable piston 28. The ram 22 is connected to the vehicle chassis 12, and a piston rod 30 connects the piston 28 to the wheel hub 11. The actuator 14 is an unequal area actuator, as shown in FIG. 1. For the actuator 14 to maintain a zero force between the wheel hub 11 and the chassis 12, the hydraulic fluid pressure in the lower chamber 26 must exceed the hydraulic fluid pressure in the upper chamber 24 by an amount functionally related to the ratio of the unequal surface areas on opposite sides of the piston 28.

The hydraulic circuit 15 also includes a pump 40, a hydraulic fluid reservoir 42, and an accumulator 44. The pump 40 communicates with the lower chamber 26 in the ram 22 through a hydraulic line 46, and maintains the hydraulic fluid pressure in the lower chamber 26 at a constant system pressure $P_S$. The reservoir 42 is at a reservoir pressure $P_R$. The pump 40 and the reservoir 42 communicate with the upper chamber 24 in the ram 22 through the on-off valve assembly 16 and a fixed orifice 48 in a hydraulic line 50. The accumulator 44 communicates with the upper chamber 24 through a fixed orifice 52.

The on-off valve assembly 16 comprises a first pilot operated check valve 60 having a first pilot line 62, and a second pilot operated check valve 64 having a second pilot line 66. The on-off valve assembly 16 further comprises an electrically operated direction control valve 68. The direction control valve 68 has a first envelope 70, a second envelope 72, and a third envelope 74.

As shown in FIG. 1, the direction control valve 68 has a first position in which the first envelope 70 communicates the first and second pilot lines 62 and 66 with the reservoir 42 through a hydraulic return line 76. The first check valve 60 is then closed to the flow of hydraulic fluid from the right to the left as shown in FIG. 1. Under normal operating conditions, the system pressure $P_S$ provided by the pump 40 in the hydraulic lines 78 and 80 to the right of the first check valve 60 exceeds the hydraulic fluid pressure in the upper chamber 24 and the hydraulic fluid pressure $P_M$ in the hydraulic line 50 to the left of the first check valve 60 because of the unequal area structure of the actuator 14. The second check valve 64 is similarly closed to the flow of hydraulic fluid from the left to the right, as viewed in FIG. 1, when the second pilot line 66 is ported to the reservoir 42 through the first envelope 70 in the direction control valve 68. The pressure $P_M$ is always greater than the reservoir pressure $P_R$, and holds the second check valve 64 closed when the pilot line 66 is ported to the reservoir pressure $P_R$. The piston 28 is thus locked against movement in the ram 22 when the direction control valve 68 is in the first position, i.e., when both pilot lines 62 and 66 are ported to the reservoir pressure $P_R$.

The direction control valve 68 has a second position in which the second envelope 72 communicates the first pilot line 62 with the pump 40 through hydraulic lines 78 and 82. When the pilot line 62 is thus ported to the system pressure $P_S$, the first check valve 60 opens. When the first check valve 60 is open, the pressure $P_M$ in the hydraulic line 50 increases toward the system pressure $P_S$. Hydraulic fluid then flows through the first check valve 60 from the right to the left, as viewed in FIG. 1, and flows into the upper chamber 24 to effect downward movement of the piston 28.

The direction control valve 68 also has a third position in which the third envelope 74 communicates the second pilot line 66 with the pump 40 through the hydraulic lines 78 and 82. When the pilot line 66 is thus ported to the system pressure $P_S$, the second check valve 64 opens. When the second check valve 64 is open, the pressure $P_M$ in the hydraulic line 50 decreases toward the reservoir pressure $P_R$. Hydraulic fluid then flows through the second check valve 64 from the left to the right, as viewed in FIG. 1, and flows out of the upper chamber 24 to effect upward movement of the piston 28.

The active suspension system 10 in accordance with the invention further comprises a plurality of sensors for sensing various acceleration, displacement, impact and vibration inputs to the vehicle. A position sensor, preferably a linear variable displacement transformer (LVDT) 90, is operatively connected between the ram 22 and the piston 28. The LVDT 90 senses displacement of the piston 28 relative to the ram 22 and, in turn, displacement of the wheel hub 11 relative to the chassis 12. A pressure transducer 92 in the ram 22 senses hydraulic fluid pressure in the upper chamber 24. A load cell 94 is operatively connected between the vehicle chassis 12 and the ram 22, and senses the load on the ram 22. A compliant rubber isolator 95 filters out insignificant variations in the load sensed by the load cell 94. The sensors further include a vehicle speed sensor 96 and one or more vehicle acceleration sensors 98, and may further include a steering angle sensor, or the like. The outputs of the sensors 90-98 provide electrical signals representing force inputs to the vehicle urging the wheel hub 11 and the piston 28 to move relative to the vehicle chassis 12.

The electrical control system 18 comprises a controller 100 and a PWM circuit 102. In a known manner, the controller 100 receives inputs from the sensors 90-98 representing inputs to the vehicle, and provides a demand signal which is a function of the inputs. The demand signal represents the desired motion, or resistance to motion, of the piston 28 in the ram 22 to obtain a desired motion or resistance to motion of the wheel hub 11 relative to the vehicle chassis 12.

Figure 2:
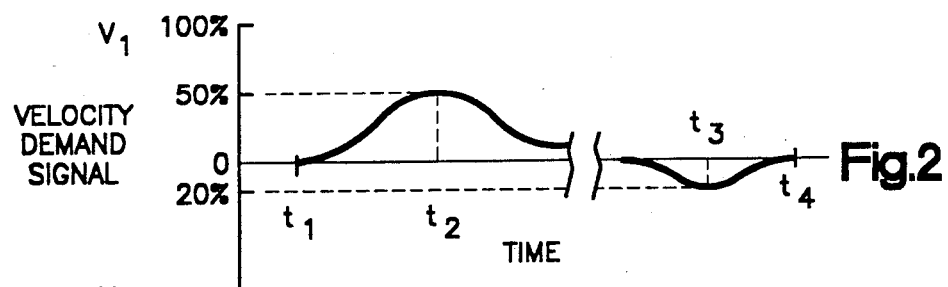
FIG. 2 is a graphic representation of an example of a demand signal provided in accordance with the present invention, with signal values approximated for clarity of illustration.

The demand signal provided by the controller 100 can be a velocity demand signal, a displacement demand signal, or a demand signal that minimizes load errors, as such demand signals are known in the art. By way of example, a velocity demand signal is represented graphically in FIG. 2. The velocity demand signal requests the piston 28 to move in a first direction at a velocity $V_1$ which varies over time, and then back in the opposite direction at a velocity $V_2$ which varies over time. At a sample time $t_2$ shown in FIG. 2, the velocity demand signal requests the piston 28 to move downward in the ram 22 at a velocity $V_1$ equal to 50% of the maximum velocity $V_1$ which the system is capable of achieving. At a later occurring sample time $t_3$, the velocity demand signal requests the piston 28 to move upward in the ram 22 at a velocity $V_2$ equal to 20% of the maximum velocity $V_2$ which the system is capable of achieving. A displacement demand signal could similarly be represented graphically with values of displacement measured on the vertical axis.

In accordance with the present invention, the PWM circuit 102 receives the demand signal as input from the controller 100. The PWM circuit 102 provides a pulse-width modulated electrical control signal having a duty cycle which is a function of the demand signal Such a PWM electrical control signal is graphically represented by way of examples in FIGS. 3A and 3B. The signal shown in FIG. 3A has a duty cycle of 50%, and is provided by the PWM circuit 102 in response to the velocity demand signal at the sample time $t_1$ shown in FIG. 2, which requests a velocity $V_1$ for the piston 28 equal to 50% of the maximum velocity $V^1$. The signal shown in FIG. 3B has a duty cycle of 20%, and is provided in response to the velocity demand signal at the later occurring sample time $t_2$ shown in FIG. 2, which requests a velocity $V_2$ for the piston 28 equal to 20% of the maximum velocity $V_2$.

Figure 3A:
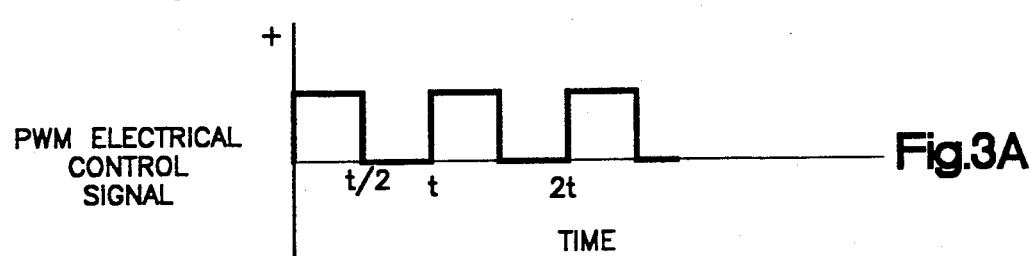
FIGS. 3A and 3B are graphic representations of examples of PWM electrical control signals provided in accordance with the present invention, with signal values approximated for clarity of illustration.

The PWM electrical control signal provided by the PWM circuit 102 is the control signal which operates the electrically operated direction control valve 68 in the on-off valve assembly 16. As described above, the direction control valve 68 is used to control opening and closing of the first and second check valves 60 and 64 to increase and decrease the hydraulic fluid pressure $P_M$. A positive pulse in the control signal, as shown in FIG. 3A, opens the first check valve 60, and increases the value of $P_M$. A negative pulse in the control signal, as shown in FIG. 3B, opens the second check valve 64, and decreases the value of $P_M$.

The on-off valve assembly 16 is thus operated so as to provide a pulse-width modulated hydraulic pressure signal in the hydraulic line 50. The PWM hydraulic pressure signal provided by the on-off valve assembly 16 has a duty cycle which is a function of the duty cycle of the PWM electrical control signal that operates the direction control valve 68. Such a PWM hydraulic pressure signal is represented graphically by way of examples in FIGS. 4A and 4B.

Figure 4A:
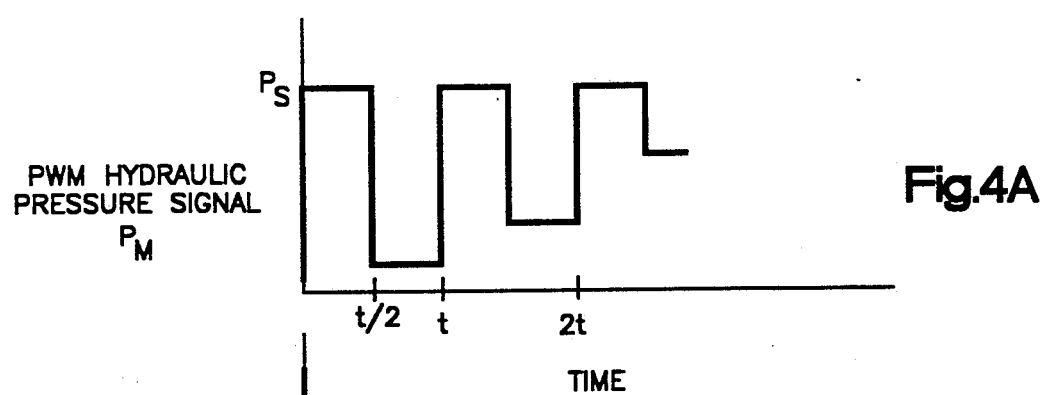
FIGS. 4A and 4B are graphic representations of examples of PWM hydraulic pressure signals provided in accordance with the present invention, with signal values approximated for clarity of illustration.

The PWM hydraulic pressure signal represented in FIG. 4A is provided by the on-off valve assembly 16 in response to a PWM electrical control signal as represented in FIG. 3A. The value of $P_M$ is shown to increase toward the value of $P_S$ in FIG. 4A. As a result, the piston 28 moves downward in the ram 22, and has a velocity functionally related to the duty cycle of the PWM hydraulic pressure signal. The duty cycle of the PWM hydraulic pressure signal shown in FIG. 4A is 50%, which is the duty cycle of the PWM electrical control signal shown in FIG. 3A, which in turn is a function of the velocity demand signal shown in FIG. 2 at sample time $t_2$. The piston 28 is thus moved downward at a velocity $V_1$ requested by the velocity demand signal.

Figure 3B:
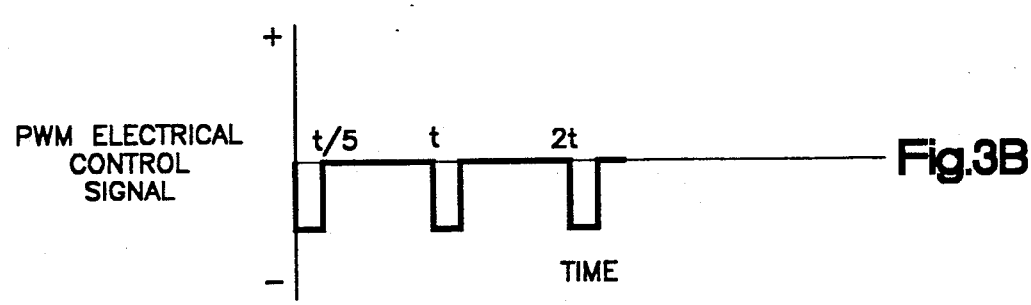
Figure 4B:
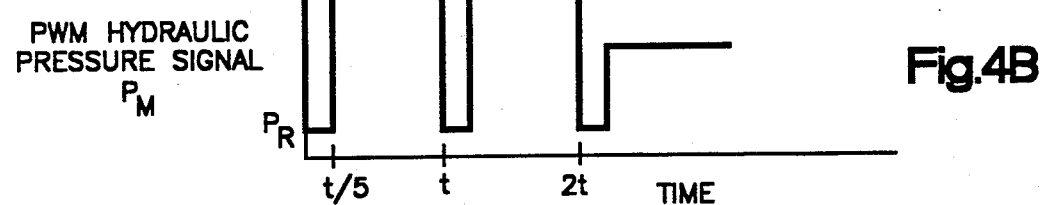

The PWM hydraulic pressure signal represented in FIG. 4B is similarly provided in response to a PWM electrical control signal as represented in FIG. 3B. The value of $P_M$ is shown to decrease in FIG. 4B. As a result, the piston 28 moves upward in the ram 22 with a velocity $V_2$ requested by the velocity demand signal at the sample time $t_3$ shown in FIG. 2. The accumulator 44 averages hydraulic fluid pressure variations in the upper chamber 24 resulting from repeated operations of the on-off valve assembly 16.

The active suspension system 10 in accordance with the invention thus controls the flow of hydraulic fluid into and out of the ram 22 by pulse-width modulating the pressure $P_M$, and by averaging the pressure on the actuator side of a fixed orifice 48 with an accumulator 44. This is in distinction to prior art systems which use expensive servo valves to control the flow under a constant pressure through a variable orifice.

From the above description of the invention, those skilled in the art will perceive improvements, changes and modifications. Such improvements, changes and modifications within the skill of the art are intended to be covered by the appended claims.

Having described the invention, the following is claimed:

1. A suspension control system for a vehicle having a sprung mass and an unsprung mass, said suspension control system comprising:
    hydraulic actuator connectable between the sprung mass and the unsprung mass, said actuator comprising a piston movable in at least one direction in a hydraulic ram in response to hydraulic fluid pressure acting on said piston in said ram;
    a hydraulic circuit communicating said ram with a source of pressurized hydraulic fluid, said hydraulic circuit comprising an on-off valve assembly between said ram and said source of pressurized hydraulic fluid, operation of said on-off valve assembly varying the pressure and quantity of hydraulic fluid in said ram and thereby co-trolling movement of said piston in said ram;
    means for sensing dynamic inputs to the vehicle;
    means for providing a demand signal in response to said inputs, said demand signal being indicative of a desired motion of said piston in said ram to achieve a desired motion of the sprung mass relative to the unsprung mass; and means for providing a control signal for operating said on-off valve assembly in response to said demand signal, said control signal being a pulse width modulated signal having a duty cycle which is a function of said demand signal.

2. A suspension control system as defined in claim 1 further comprising means for averaging fluid pressure variations resulting from repeated operations of said on-off valve assembly so as to provide an average fluid pressure in said ram which is functionally related to said demand signal.

3. A suspension control system as defined in claim 2 wherein said hydraulic ram is double-acting and said piston defines a pair of variable volume hydraulic working chambers in said ram on opposite sides of said piston, said on-off valve assembly comprising first and second on-off valves, said first on-off valve communicating one of said chambers with said source of pressurized hydraulic fluid when on, said second on-off valve communicating said one chamber with a hydraulic reservoir when on, said first and second on-off valves being responsive to said control signal to vary the hydraulic fluid pressure in said one chamber in functional relationship to said demand signal.

4. A suspension control system as defined in claim 3 wherein said actuator is an unequal area actuator.

5. A suspension control system as defined in claim 2 wherein said control signal is an electrical control signal, said on-off valve assembly being responsive to said electrical control signal for providing a pulse width modulated hydraulic flow and pressure signal having a duty cycle functionally related to said duty cycle of said electrical control signal, said on-off valve assembly varying the hydraulic fluid flow and pressure in said ram in functional relationship to said hydraulic flow and pressure signal.

6. A suspension control system as defined in claim 5 wherein said piston defines a pair of variable volume hydraulic chambers in said ram on opposite sides of said piston, said on-off valve assembly comprising first and second on-off valves, said first on-off valve communicating one of said chambers with said source of pressurized hydraulic fluid when on, said second on-off valve communicating said chamber with a hydraulic reservoir when on, said first and second on-off valves being responsive to said pulse width modulated hydraulic pressure signal.

7. A suspension control system as defined in claim 6 wherein said on-off valve assembly further comprises an electrically operated direction control valve responsive to said electrical control signal, said direction control valve having a first position communicating said source of pressurized hydraulic fluid with a first pilot line for switching on said first on-off valve, a second position communicating said source of pressurized hydraulic fluid with a second pilot line for switching on said second on-off valve, and a third position blocking communication of said source with said first and second pilot lines.

8. A suspension control system as defined in claim 7 wherein said actuator is an unequal area actuator.

9. A suspension control system for a vehicle having a sprung mass and an unsprung mass, said suspension control system comprising:

a hydraulic actuator connectable between the sprung mass and the unsprung mass, said actuator comprising a piston defining a pair of variable volume hydraulic chambers in a ram on opposite sides of said piston, said piston being movable in said ram in response to hydraulic fluid pressure acting on said piston in said chambers;

a hydraulic circuit communicating said ram with a source of pressurized hydraulic fluid, said hydraulic circuit comprising valve means communicating one of said chambers with said source, and a fixed orifice between said valve means and said one chamber, operation of said valve means varying the hydraulic fluid pressure across said orifice to control the hydraulic fluid pressure in said one chamber and thereby to effect movement of said piston in said ram;

means for sensing road induced dynamic inputs to the vehicle;

means for providing a demand signal in response to said inputs, said demand signal being indicative of a desired motion of said piston in said ram to achieve a desired motion of the sprung mass relative to the unsprung mass; and means for providing a control signal for operating said valve means in response to said demand signal, said control signal being a pulse width modulated signal having a duty cycle which is a function of said demand signal.

10. A suspension control system as defined in claim 9 further comprising means for averaging hydraulic fluid pressure variations resulting from repeated operations of said valve means so as to provide an average fluid pressure in said ram which is functionally related to said demand signal.

11. A suspension control system as defined in claim 10 further comprising means for communicating the other of said chambers with said source of pressurized hydraulic fluid to maintain a constant hydraulic fluid pressure in said other chamber.

12. A suspension control system as defined in claim 11 wherein said control signal is an electrical control signal, said valve means providing a pulse width modulated hydraulic pressure signal in response to said electrical control signal, said hydraulic pressure signal having a duty cycle which is functionally related to said duty cycle of said electrical control signal, said hydraulic circuit communicating said hydraulic pressure signal from said valve means to said fixed orifice.

13. A suspension control system as defined in claim 12 wherein said valve means comprises a first on-off valve communicating said one chamber with said source of pressurized hydraulic fluid when on, a second on-off valve communicating said one chamber with a hydraulic reservoir when on, and a direction control valve, said direction control valve having a first position communicating said source of pressurized hydraulic fluid with a first pilot line for switching on said first on-off valve, a second position communicating said source of pressurized hydraulic fluid with a second pilot line for switching on said second on-off valve, and a third position blocking communication of said source with said pilot lines, said direction control valve being responsive to said electrical control signal to operate said first and second on-off valves in functional relationship to said demand signal.

* * * * *

UNITED STATES PATENT AND TRADEMARK OFFICE
CERTIFICATE OF CORRECTION

PATENT NO. : 5,110,152
DATED : May 5, 1992
INVENTOR(S) : Neil Jones

It is certified that error appears in the above-identified patent and that said Letters Patent is hereby corrected as shown below:

Column 6, Line 53, Claim 1, before "hydraulic" insert --a--.

Column 6, Line 64, Claim 1, change "co-trolling" to --controlling--.

Signed and Sealed this

Twenty-second Day of June, 1993

Attest:

MICHAEL K. KIRK

*Attesting Officer*  Acting Commissioner of Patents and Trademarks